United States Patent
Callahan et al.

(10) Patent No.: US 10,057,350 B2
(45) Date of Patent: Aug. 21, 2018

(54) METHODS FOR TRANSFERRING DATA BASED ON ACTUAL SIZE OF A DATA OPERATION AND DEVICES THEREOF

(71) Applicant: NetApp, Inc., Sunnyvale, CA (US)

(72) Inventors: Travis Callahan, Apex, NC (US); An Zhu, Cary, NC (US); Sandeep Budanur, Cary, NC (US); Mrinal Bhattacharjee, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 205 days.

(21) Appl. No.: 14/980,940

(22) Filed: Dec. 28, 2015

(65) Prior Publication Data

US 2017/0187804 A1 Jun. 29, 2017

(51) Int. Cl.
*H04L 29/08* (2006.01)
*G06F 17/30* (2006.01)
*G06F 3/06* (2006.01)

(52) U.S. Cl.
CPC ......... *H04L 67/1097* (2013.01); *G06F 3/067* (2013.01); *G06F 3/0617* (2013.01); *G06F 3/0631* (2013.01); *G06F 3/0643* (2013.01); *G06F 3/0653* (2013.01); *G06F 17/302* (2013.01); *H04L 67/06* (2013.01)

(58) Field of Classification Search
CPC .... G06F 3/0617; G06F 3/0631; G06F 3/0643; G06F 3/0653; G06F 3/067; G06F 17/302; H04L 67/06; H04L 67/1097
See application file for complete search history.

(56) References Cited

U.S. PATENT DOCUMENTS

| | | | |
|---|---|---|---|
| 6,170,067 B1* | 1/2001 | Liu | G06F 1/26 714/31 |
| 2011/0099149 A1* | 4/2011 | Kim | G06F 11/1471 707/640 |
| 2015/0120656 A1* | 4/2015 | Ramnarayanan | G06F 17/30129 707/616 |
| 2015/0331760 A1 | 11/2015 | Dalessandro et al. | |
| 2016/0048351 A1* | 2/2016 | Kanteti | G06F 11/1471 714/19 |

* cited by examiner

*Primary Examiner* — Gil H. Lee
(74) *Attorney, Agent, or Firm* — LeClairRyan PLLC

(57) ABSTRACT

A method, non-transitory computer readable medium, and device that assists with transferring data based on actual size of a data operation includes receiving a data operation from a client computing device. A type of the received data operation is determined and additional memory size associated with the determined type of the received data operation is identified. Next, a non-volatile log file is updated with the identified additional memory size and the determined type of the received data operation.

12 Claims, 4 Drawing Sheets

FIG. 4

METHODS FOR TRANSFERRING DATA BASED ON ACTUAL SIZE OF A DATA OPERATION AND DEVICES THEREOF

FIELD

This technology generally relates to data storage management and, more particularly, methods for transferring data based on actual size of a data operation and devices thereof.

BACKGROUND

Data storage servers ("storage servers") can store data redundantly, e.g., across multiple data storage devices. Storage servers may employ various forms of data storage devices, e.g., hard disk drives, solid state drives, tape devices, etc. The data storage devices are typically implemented as one or more storage "volumes" that comprise a cluster of data storage devices, in which the volumes define an overall logical arrangement of storage space. For example, a storage server can serve a large number (e.g., 150 or more) of discrete volumes. Each volume is generally associated with its own file system (e.g., a write anywhere file system).

To improve performance, storage servers can temporarily store various data storage commands ("storage operations" or simply "operations") they receive from client computing devices in a nonvolatile random access memory (NVRAM), e.g., in a log file stored in the NVRAM. The NVRAM log file can accumulate storage operations until the NVRAM is almost fully filled. When the NVRAM is almost fully filled, data is transferred from the storage server system memory to underlying data storage volumes, and the NVRAM is cleared of the transferred data upon successful transfer. However, prior technologies fail to accurately determine when the NVRAM log file is actually full because they fail to consider the additional memory space required to perform certain data storage commands.

BRIEF DESCRIPTION OF THE DRAWINGS

FIG. 4 is an exemplary table illustrating the actual size of the data operation.

DETAILED DESCRIPTION

Figure 1:
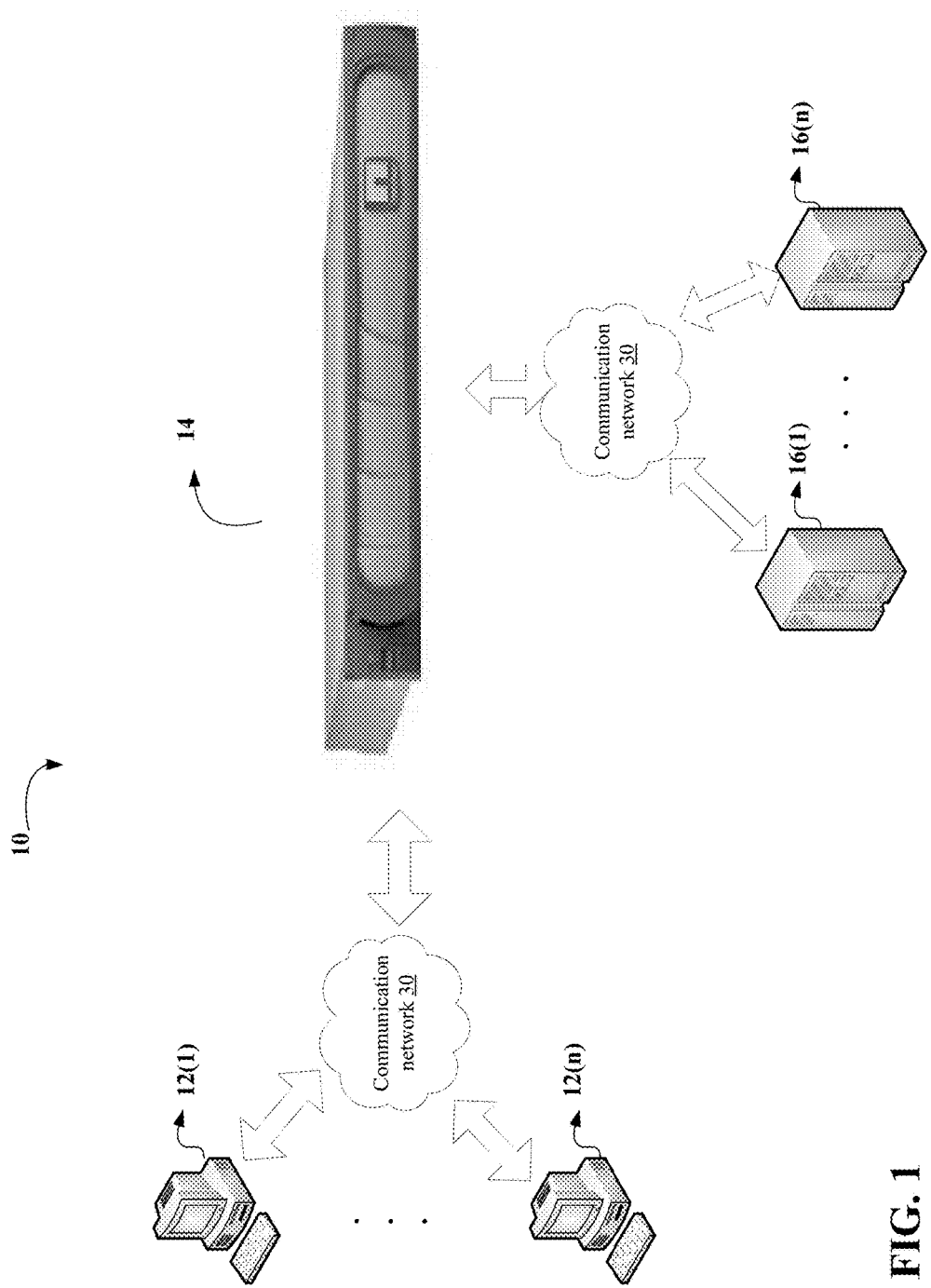
FIG. 1 is a block diagram of an environment with an exemplary storage management computing device.

An environment 10 with a plurality of client computing devices 12(1)-12(n), an exemplary storage management computing device 14, a plurality of storage devices 16(1)-16(n) is illustrated in FIG. 1. In this particular example, the environment 10 in FIG. 1 includes the plurality of client computing devices 12(1)-12(n), the storage management computing device 14 and a plurality of storage devices 16(1)-16(n) coupled via one or more communication networks 30, although the environment could include other types and numbers of systems, devices, components, and/or other elements. The example of a method for transferring data based on actual size of a data operation is executed by the storage management computing device 14, although the approaches illustrated and described herein could be executed by other systems and devices. The environment 10 may include other types and numbers of other network elements and devices, as is generally known in the art and will not be illustrated or described herein. This technology provides a number of advantages including providing methods, non-transitory computer readable media and devices for transferring data based on actual size of a data operation.

Figure 2:
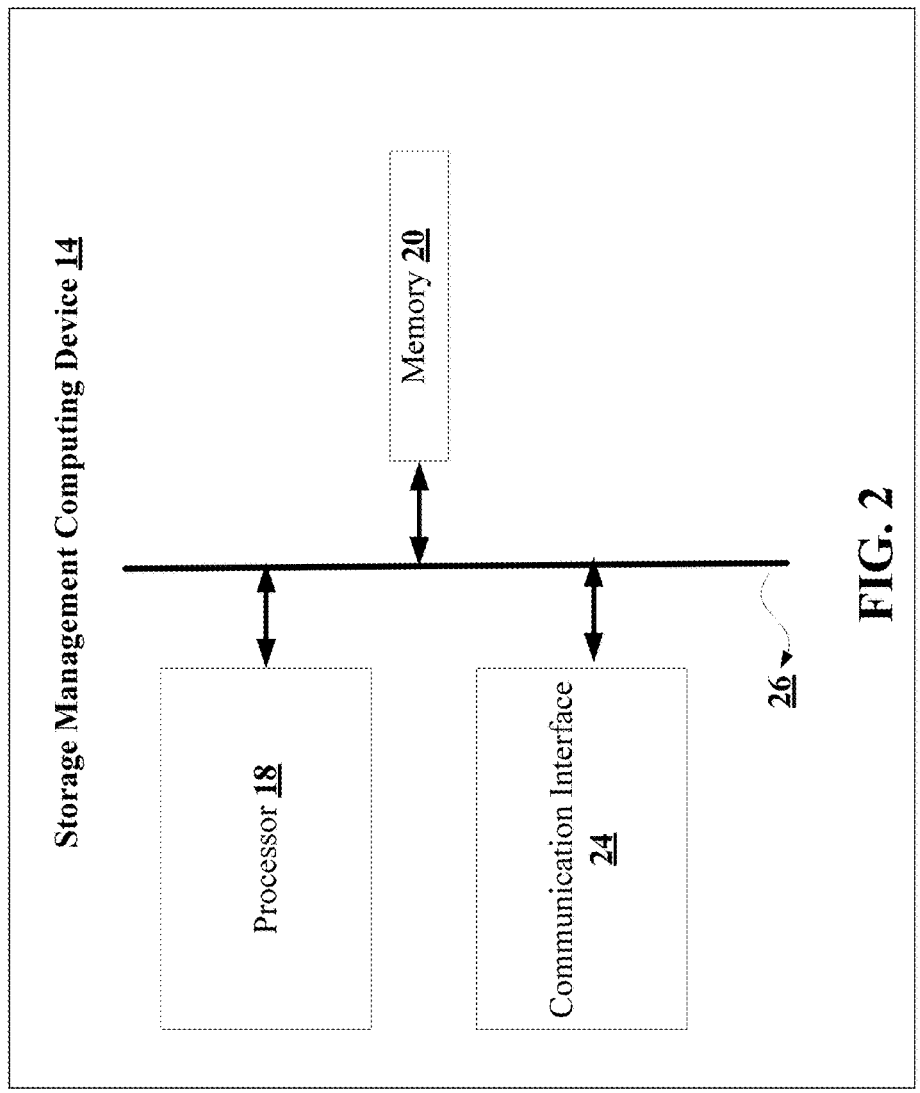
FIG. 2 is a block diagram of the exemplary storage management computing device shown in FIG. 1.
Figure 3:
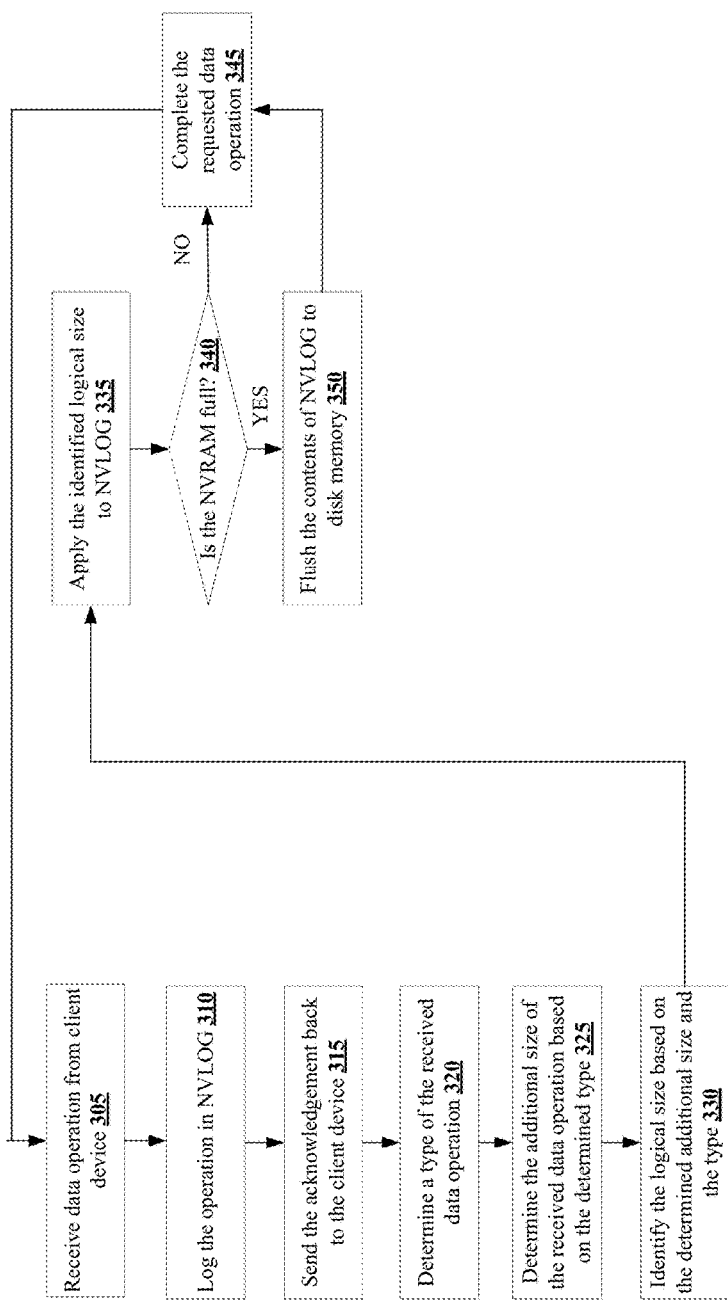
FIG. 3 is a flow chart of an example of a method for transferring data based on actual size of a data operation.

Referring to FIG. 2, in this example the storage management computing device 14 includes a processor 18, a memory 20, and a communication interface 24 which are coupled together by a bus 26, although the storage management computing device 14 may include other types and numbers of elements in other configurations.

The processor 18 of the storage management computing device 14 may execute one or more programmed instructions stored in the memory 20 for transferring data based on actual size of a data operation as illustrated and described in the examples herein, although other types and numbers of functions and/or other operation can be performed. The processor 18 of the storage management computing device 14 may include one or more central processing units ("CPUs") or general purpose processors with one or more processing cores, such as AMD® processor(s), although other types of processor(s) could be used (e.g., Intel®).

The memory 20 of the storage management computing device 14 stores the programmed instructions and other data for one or more aspects of the present technology as described and illustrated herein, although some or all of the programmed instructions could be stored and executed elsewhere. A variety of different types of memory storage devices, such as a non-volatile memory, random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 18, can be used for the memory 20.

The communication interface 24 of the storage management computing device 14 operatively couples and communicates with the plurality of client computing devices 12(1)-12(n) and the plurality of storage devices 16(1)-16(n), which are all coupled together by the communication network 30, although other types and numbers of communication networks or systems with other types and numbers of connections and configurations to other devices and elements. By way of example only, the communication network 30 can use TCP/IP over Ethernet and industry-standard protocols, including NFS, CIFS, SOAP, XML, LDAP, and SNMP, although other types and numbers of communication networks, can be used. The communication networks 30 in this example may employ any suitable interface mechanisms and network communication technologies, including, for example, any local area network, any wide area network (e.g., Internet), teletraffic in any suitable form (e.g., voice, modem, and the like), Public Switched Telephone Network (PSTNs), Ethernet-based Packet Data Networks (PDNs), and any combinations thereof and the like. In this example, the bus 26 is a universal serial bus, although other bus types and links may be used, such as PCI-Express or hyper-transport bus.

Each of the plurality of client computing devices 12(1)-12(n) includes a central processing unit (CPU) or processor, a memory, and an I/O system, which are coupled together by a bus or other link, although other numbers and types of network devices could be used. The plurality of client computing devices 12(1)-12(n) communicates with the storage management computing device 14 to request block access storage in the plurality of storage devices 16(1)-16

(n), although the client computing devices 12(1)-12(n) can interact with the storage management computing device 14 for other purposes. By way of example, the plurality of client computing devices 12(1)-12(n) may run application(s) that may provide an interface to make requests to access, modify, delete, edit, read or write data within storage management computing device 14 or the plurality of storage devices 16(1)-16(n) via the communication network 30.

Each of the plurality of storage devices 16(1)-16(n) includes a central processing unit (CPU) or processor, and an I/O system, which are coupled together by a bus or other link, although other numbers and types of network devices could be used. Each plurality of storage devices 16(1)-16(n) assists with providing fault-tolerant backup of data, enabling the integrity of data storage transactions to survive a service interruption based upon a power failure or other fault, although the plurality of storage devices 16(1)-16(n) can assist with other types of operations such as storing of files or data. Various network processing applications, such as CIFS applications, NFS applications, HTTP Web Data storage device applications, and/or FTP applications, may be operating on the plurality of storage devices 16(1)-16(n) and transmitting data (e.g., files or web pages) in response to requests from the storage management computing device 14 and the plurality of client computing devices 12(1)-12(n). It is to be understood that the plurality of storage devices 16(1)-16(n) may be hardware or software or may represent a system with multiple external resource servers, which may include internal or external networks.

Although the exemplary network environment 10 includes the plurality of client computing devices 12(1)-12(n), the storage management computing device 14, and the plurality of storage devices 16(1)-16(n) described and illustrated herein, other types and numbers of systems, devices, components, and/or other elements in other topologies can be used. It is to be understood that the systems of the examples described herein are for exemplary purposes, as many variations of the specific hardware and software used to implement the examples are possible, as will be appreciated by those of ordinary skill in the art.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples also may be embodied as a non-transitory computer readable medium having instructions stored thereon for one or more aspects of the present technology as described and illustrated by way of the examples herein, as described herein, which when executed by the processor, cause the processor to carry out the steps necessary to implement the methods of this technology as described and illustrated with the examples herein.

An example of a method for transferring data based on actual size of a data operation will now be described herein with reference to FIGS. 1-4. The exemplary method beings at step 305 where the storage management computing device 14 receives a write data operation for one of the files present in one of the plurality of storage devices 16(1)-16(n) from one of the plurality of client computing devices 12(1)-12(n), although the storage management computing device 14 can receive other types and /or numbers of operations.

Next in step 310, the storage management computing device 14 logs the received write data operation into a non-volatile log (NVLOG) or a journal present in the NVRAM of one of the plurality of storage devices 16(1)-16(n) on which the write operation is required to be performed, although the storage management computing device 14 can log the information at other locations. In this example, the NVLOG or journal includes the size of the data storage operations, and data storage operations, such as write operation or read operation stored in sequential order by way of example, although the NVLOG or journal information can include other types and/or amounts of information stored in other sequencing orders. In this example, the size of the data operation relates to the size of the data that is required to be written to the data block or file, although the size of the data operation can include other types or amounts of information associated with the received request. By using the details of the logged on to NVLOG, the storage management computing device 14 can assist the plurality of storage devices 16(1)-16(n) to recover from an unexpected service interruption, such as a power failure.

In step 315, the storage management computing device 14 sends an acknowledgement back to the requesting one of the plurality of client computing devices 12(1)-12(n) confirming the receipt of the write operation. Using this technique, the technology is able to significantly reduce the waiting time for the requesting one of the plurality of client computing devices 12(1)-12(n) when compared to the prior techniques that required the received data operation be first stored in the system memory of one of the plurality of storage devices 16(1)-16(n) which is a time consuming process and then once stored to send the acknowledgement to the requesting client computing device. Additionally in this example of the technology, upon sending the acknowledgement to the requesting one of the plurality of client computing devices 12(1)-12(n), the storage management computing device 14 can also provide the requesting one of the plurality of client computing devices 12(1)-12(n) the associated data block to perform the received write data operation.

Next in step 320, the storage management computing device 14 determines the type of the received write data operation using by way of example the technique illustrated in U.S. Publication No. 2015/0331760, entitled "Performance during playback of logged data storage operations", which is incorporated by reference herein in its entirety, although the storage management computing device 14 can use other techniques to determine the type of the received write data operation. By way of example, the type of the received write date operation determined by the storage management computing device 14 can be a sequential write operation, or a random write operation, although the storage management computing device 14 can determine other types data operations.

Next in step 325, the storage management computing device 14 determines the additional size of the requested data operation based on the determined type of the received data operation, although the storage management computing device 14 can identify the size based on other parameters. By way of example, the additional size relates to the amount of additional memory space required to perform the specific type of data operation. In this example, the storage management computing device 14 uses the technique illustrated in U.S. Publication No. 2015/0331760, entitled "Performance during playback of logged data storage operations", which is incorporated by reference herein in its entirety, to determine the additional size, although the storage management computing device 14 can use other techniques to determine the additional size. Alternatively, the memory 20 of the storage management computing device 14 can include data associated with additional size that is required to be added to the actual size (the size of the data operation of the received request) based on the determined type of the data operation.

Figure 4:
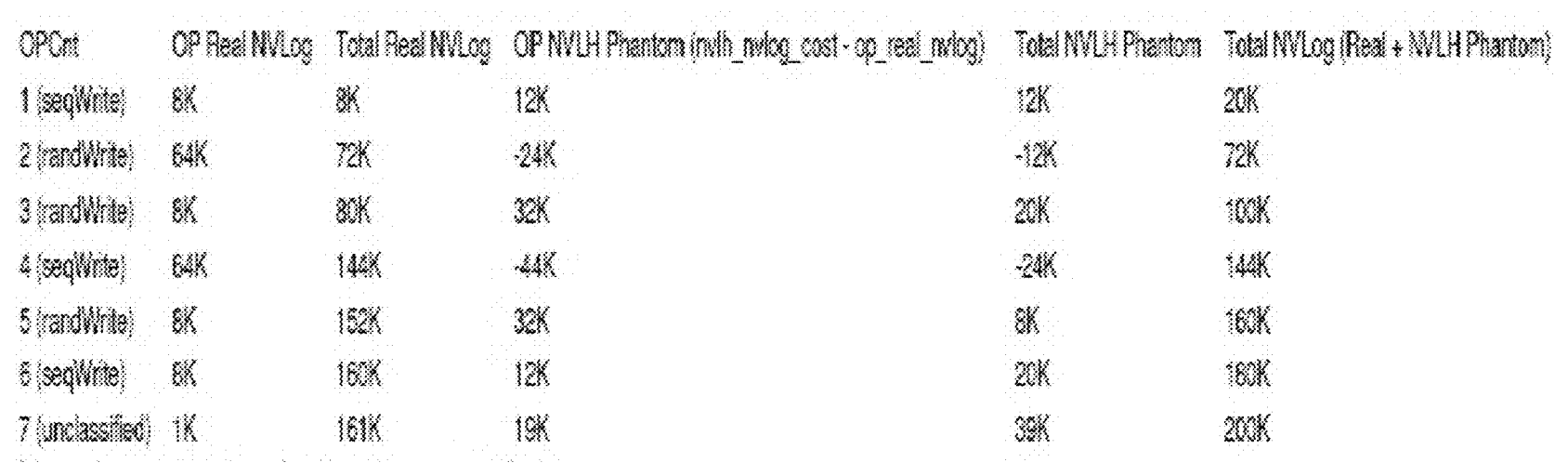

In step 330, the storage management computing device 14 identifies the logical size or the actual size of the received data operation by adding the determined additional size to the original size of the received data operation, although the storage management computing device 14 can identify the logical size or the actual size of the data operation using other techniques. By way of example, FIG. 4 illustrates an example of the actual size of the data operation. By way of example, the first column in FIG. 4 illustrates the type of the received data operation, the second column illustrates the size of the received data (OP Real NVLog), the identified additional size in the fourth column (OP NVLH Phantom), and finally the actual size or the logical size of the data operation in the last column (Total NVLog). By way of example in the first row of FIG. 4, the actual size of the seqWrite data operation can be calculated by adding the total real NVlog entry 8K with the data in total NVLH Phantom column 12K. In this example, the total size of the seqWrite operation is 20k.

Next in step 335, the storage management computing device 14 updates the NVLOG entry associated with the received data operation with the identified actual size, although the storage management computing device 14 can make other types or amounts of modifications to the NVLOG. By updating the NVLOG with the identified actual size, the technology disclosed is able to accurately determine the amount of memory space actually required to perform the received data operation.

In step 340, the storage management computing device 14 determines when updating the NVLOG entry with the identified actual size has now resulted in reaching a threshold memory size of the NVRAM. By way of example, the NVRAM in each of the plurality of storage devices 16(1)-16(n) has a stored threshold size within which it can handle the data that may be adjusted. In this example, adding more data into the NVLOG present in the NVRAM results in using the available memory space within the NVRAM of the plurality of storage devices 16(1)-16(n). Accordingly, when the storage management computing device 14 determines that the NVRAM is not full as a result of updating the NVLOG, then the No branch is taken to step 345.

In step 345, the storage management computing device 14 completes the requested data operation and the exemplary flow proceeds back to step 305 where the storage management computing device 14 receives a subsequent request for data operation from the plurality of client computing devices 12(1)-12(n).

However back in step 340, when the storage management computing device 14 determines that NVRAM is full, then the Yes branch is taken to step 350. In step 350, the storage management computing device 14 transfers out the data present in the NVRAM to the memory disk in the plurality of storage devices 16(1)-16(n) and the exemplary flow proceeds to step 345 where the storage management computing device 14 completes the received data operation.

Accordingly, as illustrated and described by way of the examples herein, this technology provides methods, non-transitory computer readable media and devices for transferring data based on actual size of a data operation.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method comprising:
identifying, by a computing device, an additional memory size associated with a determined type of a received data operation, wherein the additional memory size is an amount of additional memory required to perform the type of the received data operation;
determining, by the computing device, an actual memory size of the received data operation by adding an original memory size of the received data operation with the identified additional memory size;
updating, by the computing device, a non-volatile log file with the determined actual memory size and the type of the received data operation; and
completing, by the computing device, the received data operation upon transferring data from the non-volatile log file to a disk memory when a memory device associated with the non-volatile log file is determined to have reached a threshold memory usage based on the updating.

2. The method as set forth in claim 1 further comprising logging, by the computing device, data associated with the received data operation in the non-volatile log file.

3. The method as set forth in claim 1 further comprising updating, by the computing device, the non-volatile log file with an identified logical size associated with the received data operation.

4. The method as set forth in claim 1 further comprising transferring, by the computing device, data from the non-volatile log file to a disk memory of one of a plurality of storage devices when a NVRAM associated with the non-volatile log file is determined to have reached the threshold memory usage, wherein the memory device is the NVRAM.

5. A non-transitory computer readable medium having stored thereon instructions for transferring data based on actual size of a data operation comprising executable code which when executed by a processor, causes the processor to perform steps to and that comprise:
identify an additional memory size associated with a determined type of a received data operation, wherein the additional memory size is an amount of additional memory required to perform the type of the received data operation;
determine an actual memory size of the received data operation by adding an original memory size of the received data operation with the identified additional memory size;

update a non-volatile log file with the determined actual memory size and the type of the received data operation; and complete the received data operation upon transferring data from the non-volatile log file to a disk memory when a memory device associated with the non-volatile log file is determined to have reached a threshold memory usage based on the updating.

6. The medium as set forth in claim 5 further comprises log data associated with the received data operation in the non-volatile log file.

7. The medium as set forth in claim 5 further comprises update the non-volatile log file with an identified logical size associated with the received data operation.

8. The medium as set forth in claim 5 further comprises transfer data from the non-volatile log file to a disk memory of one of a plurality of storage devices when a NVRAM associated with the non-volatile log file is determined to have reached the threshold memory usage, wherein the memory device is the NVRAM.

9. A computing device comprising:
 a processor;
 a memory coupled to the processor which is configured to be capable of executing programmed instructions comprising and stored in the memory to:
 identify an additional memory size associated with a determined type of a received data operation, wherein the additional memory size is an amount of additional memory required to perform the type of the received data operation;
 determine an actual memory size of the received data operation by adding an original memory size of the received data operation with the identified additional memory size;
 update a non-volatile log file with the determined actual memory size and the type of the received data operation; and
 complete the received data operation upon transferring data from the non-volatile log file to a disk memory when a memory device associated with the non-volatile log file is determined to have reached a threshold memory usage based on the updating.

10. The device as set forth in claim 9 wherein the processor coupled to the memory is further configured to be capable of executing at least one additional programmed instruction comprising and stored in the memory to log data associated with the received data operation in the non-volatile log file.

11. The device as set forth in claim 9 wherein the processor coupled to the memory is further configured to be capable of executing at least one additional programmed instruction comprising and stored in the memory to update the non-volatile log file with an identified logical size associated with the received data operation.

12. The device as set forth in claim 9 wherein the processor coupled to the memory is further configured to be capable of executing at least one additional programmed instruction comprising and stored in the memory to transfer data from the non-volatile log file to a disk memory of one of a plurality of storage devices when a NVRAM associated with the non-volatile log file is determined to have reached the threshold memory usage, wherein the memory device is the NVRAM.

* * * * *